United States Patent [19]

Wright

[11] 4,269,292

[45] May 26, 1981

[54] DRIVE MECHANISM FOR A HIGH SPEED FILM TRANSPORT AND THE LIKE

[75] Inventor: Charles W. Wright, Los Angeles, Calif.

[73] Assignee: Scentex Corporation, Los Angeles, Calif.

[21] Appl. No.: 61,317

[22] Filed: Jul. 27, 1979

Related U.S. Application Data

[63] Continuation-in-part of Ser. No. 941,973, Sep. 13, 1978, abandoned.

[51] Int. Cl.³ .................... F16D 11/06; F16D 43/02
[52] U.S. Cl. .................... 192/33 R; 74/69; 192/89 A; 192/101
[58] Field of Search ............... 74/69; 192/65, 66, 90, 192/114 R, 138, 33 R, 101, 89 A

[56] References Cited

U.S. PATENT DOCUMENTS

| | | | |
|---|---|---|---|
| 1,595,124 | 8/1926 | Simmons | 192/90 |
| 1,741,439 | 12/1929 | Seybold | 192/138 |
| 2,224,192 | 12/1940 | Madsen | 192/138 |
| 2,756,854 | 7/1956 | Brenholts | 192/66 |
| 2,915,160 | 12/1959 | Schneider | 192/33 R |
| 2,924,317 | 2/1960 | Holstein | 192/33 R X |
| 3,295,381 | 1/1967 | Czarnecki | 74/69 |
| 3,530,731 | 9/1970 | Koch et al. | 74/69 |
| 4,023,422 | 5/1977 | Jou et al. | 192/66 |

FOREIGN PATENT DOCUMENTS

| | | | |
|---|---|---|---|
| 63760 | 7/1945 | Denmark | 192/114 |
| 345780 | 12/1921 | Fed. Rep. of Germany | 192/66 |
| 955743 | 1/1957 | Fed. Rep. of Germany | 192/114 |
| 487827 | 5/1918 | France | 192/66 |
| 52-27950 | 2/1977 | Japan | 192/33 R |

*Primary Examiner*—Lawrence J. Staab
*Attorney, Agent, or Firm*—Keith D. Beecher

[57] ABSTRACT

A lost-motion drive mechanism is provided which is particularly, although not exclusively, adapted for use as a high speed transport for an X-ray film, or the like, in an X-ray camera. The drive mechanism includes an input shaft for coupling a drive motor to the drive shaft of the transport. Actuators are interposed between the input shaft and the drive shaft. As the input shaft is driven through one complete revolution (360°) by the drive motor, the actuators cause the drive shaft to turn with an angular velocity which rises gradually from zero to a maximum for the first 180° of rotation of the input shaft, and then with an angular velocity which decreases gradually from a maximum to zero for the next 180° of rotation of the input shaft. The assembly of the invention overcomes inertia problems which are encountered, for example, in X-ray cameras when relatively large X-ray films (105 mm, for example) are used; and for providing a high speed transport for such films (for example, 44 milliseconds from one frame to another), without any danger of shock or breakage to the film or to the drive elements of the transports. The lost motion is achieved by two actuators which rotate about intersecting orbits on a 1:1 ratio. A unique self-tightening clutch is provided which is controlled to permit one rotation of the drive shaft each time the mechanism is activated.

6 Claims, 9 Drawing Figures

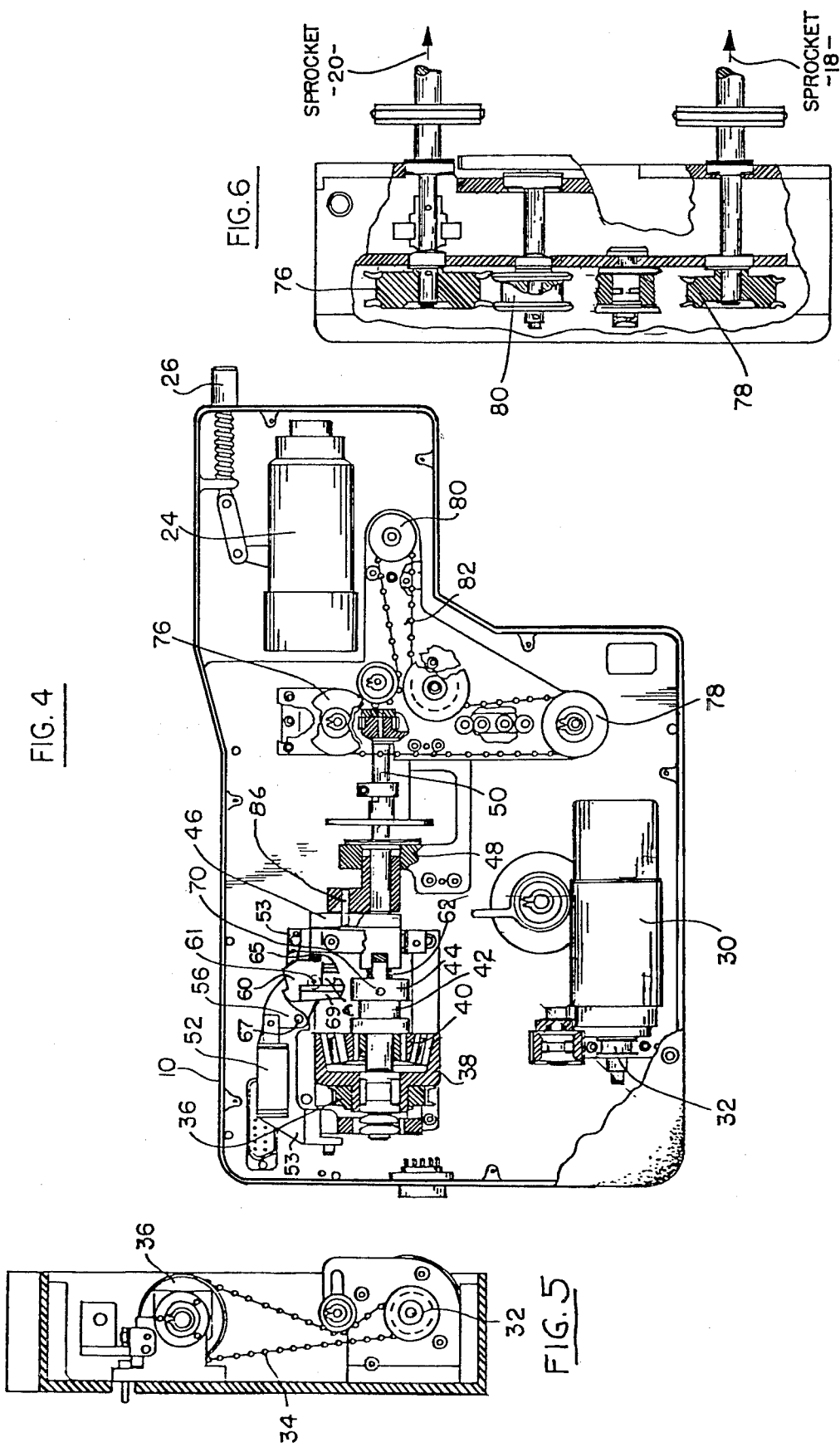

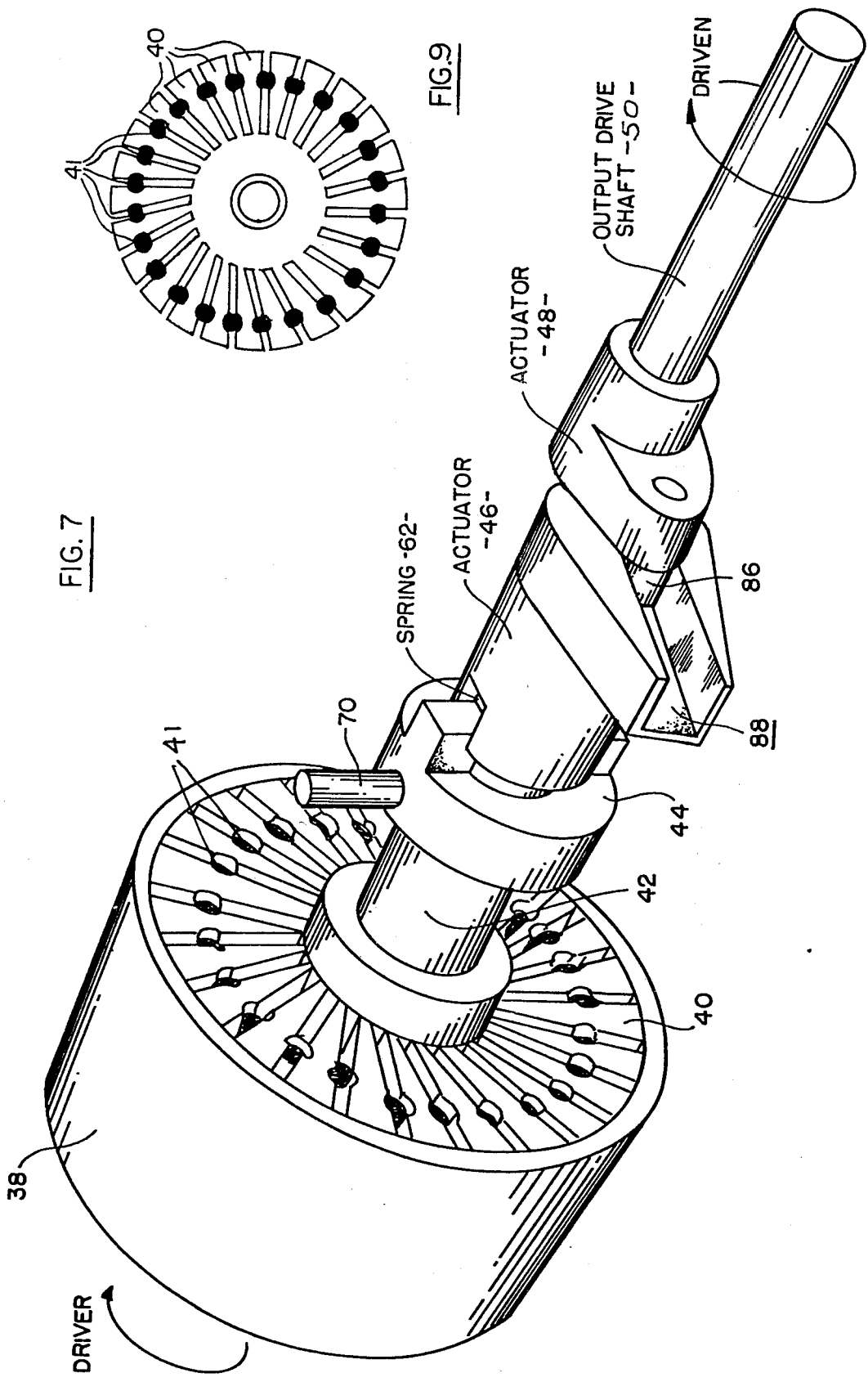

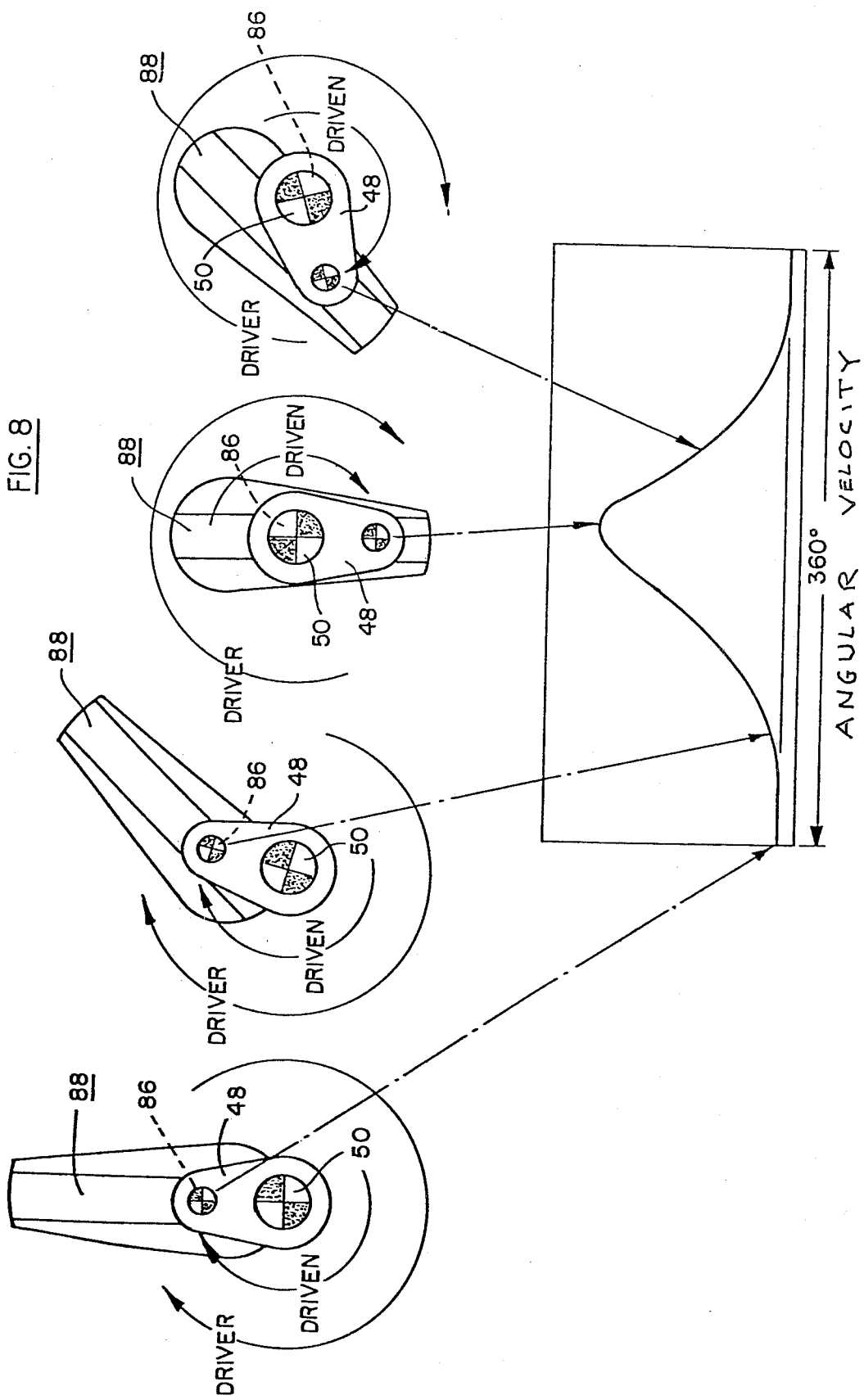

DRIVE MECHANISM FOR A HIGH SPEED FILM TRANSPORT AND THE LIKE

This application is a continuation-in-part of copending application Ser. No. 941,973, filed Sept. 13, 1978 now abandoned.

BACKGROUND OF THE INVENTION

As is well known, in all cameras, the film must be positioned in the focal plane of the optical system and, in the roll-film type camera, the film must be wound from one spool, or reel, to another to permit a series of pictures to be made on the roll of film.

Problems have arisen in the past in cameras, and especially in X-ray cameras, when relatively large and heavy film is used, and where high speed transport of the film from frame-to-frame is desired. This is because, as the weight of the film increases, its inertia increases with a power of 2. With large size, heavy films, therefore, any abrupt start or stops of the film creates shocks in the film and adversely affects the images developed thereon. However, it is necessary that the film be completely stopped at each successive frame for each successive exposure, and when high speeds are required, the aforesaid problem arises.

As described briefly above, the problem is solved in the drive mechanism of the present invention by the provision of a lost motion drive mechanism which causes the drive motor to impart a varying speed to the transport. For example, as the drive motor rotates through 0°–180°, the transport is accelerated so that its speed rises from zero to a maximum at 180°; and as the drive motor rotates through 180°–360°, the transport is decelerated so that its speed drops from a maximum of zero at 360°. As also described, a unique self-tightening clutch assembly is also provided to produce one revolution only of the drive shaft of the camera each time the mechanism is activated.

In this way, the lost motion drive mechanism of the invention overcomes inertia problems in either starting or stopping a mass, such as an X-ray film. In a particular constructed embodiment of the invention, for example, in which the drive mechanism was used to drive X-ray film in an X-ray camera, the drive motor was caused to rotate four times faster than the transport for the first and last 5° of angular movement of the motor, whereas at the center of the cycle, the transport is caused to travel 1.75 times faster than the drive motor.

BRIEF DESCRIPTION OF THE DRAWINGS

FIG. 4 is a more detailed side view representation of the camera, showing the manner in which the film is moved from frame-to-frame;

FIG. 5 is an end view of the camera of FIG. 4 taken from the left, and partly in section to reveal the internal operating components;

FIG. 6 is an end view of the camera, taken from the right of FIG. 4, and partly in section to reveal certain operating components;

FIG. 7 is a perspective representation of a lost motion drive mechanism constructed in accordance with the concepts of the invention and which is incorporated in the camera of FIGS. 1–6;

FIG. 8 is a schematic representation of certain of the components of the lost motion drive mechanism of FIG. 7, as the input shaft of the drive mechanism rotates through 360°, and also includes a curve illustrating the acceleration and deceleration encountered during one complete revolution of the input shaft; and FIG. 9 is an end view of one of the elements of a self-tightening clutch which is included in the drive mechanism of FIG. 7.

DETAILED DESCRIPTION OF THE ILLUSTRATED EMBODIMENT

Figure 3:
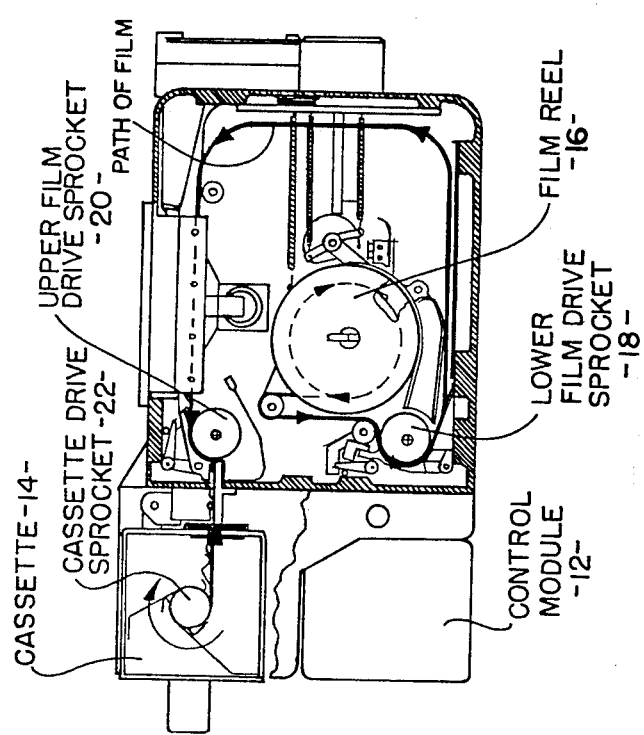
FIG. 3 is a side view of the camera, with the side plate removed to reveal certain of the internal operating components.
Figure 1:
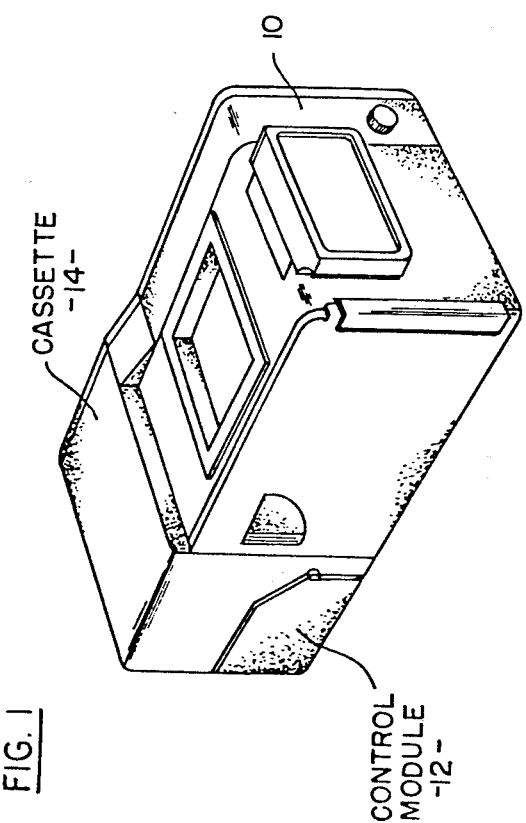
FIG. 1 is a front schematic perspective view of an X-ray camera which may be constructed to incorporate the lost motion drive mechanism of the invention.
Figure 2:
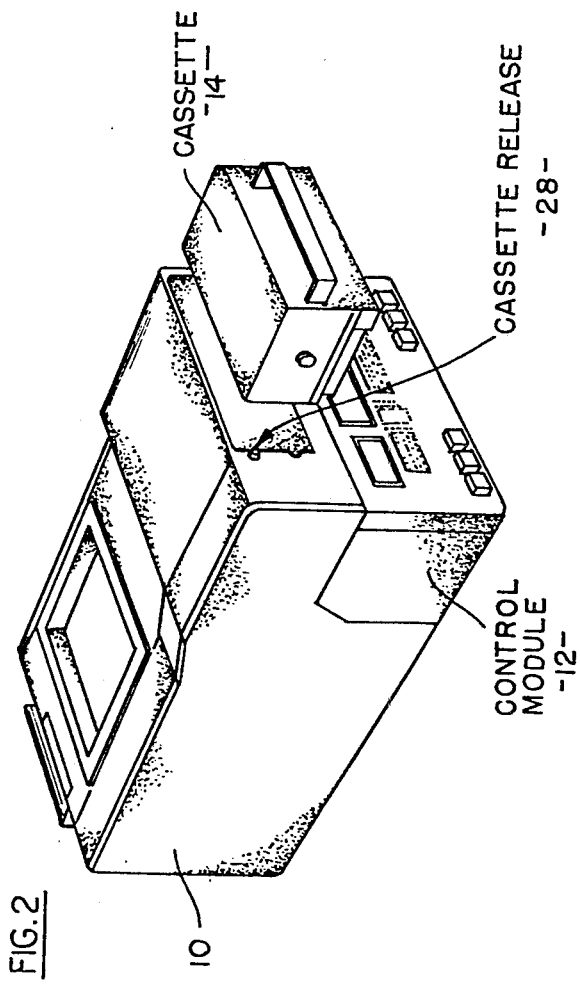
FIG. 2 is a rear perspective view of the camera of FIG. 1.

The camera, as shown in FIGS. 1–3 includes a housing 10, and a control module 12 is received in one end of the housing. The control module includes the necessary electronics for operating the camera. A cassette 14 is also received in the camera. The housing has a side door, which may be opened so that a film reel 16 may be mounted within the camera. The film from the film reel 16 is threaded around a lower drive sprocket 18, an upper drive sprocket 20, and around a cassette drive sprocket 22 within the cassette 14.

When the camera is operated, the film is drawn along the path illustrated by the arrow in FIG. 3, to be received within the cassette 14. An appropriate film cutting mechanism 24 (FIG. 4), which is operated by a spring-loaded pushbutton 26, permits any desired quantity of film to be collected in the cassette 14, and removed when the cassette is released from the unit by pushing the cassette release 28 (FIG. 2).

As best shown in FIGS. 4, 5 and 6, an electric motor 30 is mounted within the housing 10, and a pulley 32 on the drive shaft of the motor is coupled by a belt 34 to a pulley 36. Pulley 36 drives a hollow cylindrical flywheel member 38 of a clutch mechanism, the bore of member 38 being tapered, as shown in FIG. 4. A truncated conical clutch member 40 formed of Nylon or other appropriate material, is mounted coaxially within the cylindrical member 38 on a clutch shaft 42. A coupler 44 couples the clutch shaft 42 to a first actuator 46 which, in turn, is coupled to a second actuator 48. The first actuator 46 is supported on an input shaft which is coaxial with the clutch shaft 42. The second actuator 48 is mounted on an output shaft 50 which is displaced radially from the input shaft. The actuators and clutch mechanism will be described in more detail in conjunction with FIG. 7.

The mechanism of FIG. 4 includes a solenoid 52 which is mounted on a frame 53, and which is coupled to a latch 56. Latch 56 is pivotally mounted on frame 53 by a pin 67, and it is spring-biased in a clockwise direction by a coil spring (not shown). Latch 56 engages a further latch 60 which also is pivotally mounted on frame 53 by a pin 61, and which is spring-biased in a counterclockwise direction by a coil spring (not shown). The rotation of latch 60 in the counterclockwise direction is limited by a pin 65 mounted on frame 53 and extending outwardly from the frame.

As shaft 42 and coupler 44 rotate, a radial pin 70 mounted on the coupler moves against the right-hand surface of a cam 69 which is integral with latch 60. As long as latch 56 is latched with latch 60, as shown in FIG. 4, the latch 60 is held against clockwise rotation by latch 56. Then pin 70, as it is rotated against the right-hand surface of cam 69, is moved to the right in FIG. 4, moving the coupler 44 to the right against the force of a spring 62, so that the clutch member 40 is displaced out of engagement with the hollow cylindrical flywheel member 38. When that occurs, shaft 42 and coupler 44 no longer turn, and radial pin 70 is locked in position in space A, in engagement with the right-hand surface of cam 69. In this position, the radial pin 70 holds the coupler 44 shifted to the right in FIG. 4 against the force of spring 62 to maintain the clutch disengaged.

However, when solenoid 52 is energized, latch 56 turns and releases latch 60, so that latch 60 is turned in a clockwise direction by the force of spring 62 which forces pin 70 against cam 69. Coupler 44 is now released, and spring 62 causes the coupler to drive the clutch member 40 into concentric relationship within hollow cylindrical member 38, and into frictional engagement therewith, so that the clutch is engaged, and motion is transmitted through the clutch. As such motion is transmitted through the clutch, the radial pin 70 turns with coupler 44 through space "A" for one complete revolution of the coupler 44. As the pin passes through the space A, latch 56 again engages latch 60, so that the next time pin 70 engages cam 69, at the end of one complete revolution of coupler 44, it moves the coupler to the right against the force of spring 62 and disengages the clutch. Shaft 42 now stops turning, and motion is arrested until solenoid 52 is again energized.

Therefore, each time solenoid 52 is energized, clutch 40 engages and causes shaft 42 to turn through one complete revolution, at which time the clutch disengages and the shaft stops.

The output shaft 50 drives a pulley 76 through an appropriate gear chain, and pulley 76 drives a further pulley 78, and a pulley 80 through a belt 82. Pulley 76 drives the upper film sprocket 20, and pulley 78 drives the lower film sprocket 18. Pulley 80 drives the cassette drive sprocket 22.

In the operation of the camera, the motor 30 is continuously energized to turn pulley 32 and pulley 36. The clutch is normally released, so that no motion is imparted to the film itself. When the solenoid 52 is energized, the truncated conical clutch member 40 is driven into concentric frictional engagement with the cylindrical member 38 by spring 62 imparting a rotational motion to the clutch shaft 42 for one complete revolution of the shaft, as described above. This motion is translated through the coupler 44 to the actuator 46, and through the actuator 46 and actuator 48 to the output drive shaft 50.

The operation of the actuators is such that as the clutch shaft 42 rotates from 0° to 180°, the angular velocity of the output drive shaft 50 accelerates from zero to a maximum, and then as the clutch shaft rotates from 180° to 360°, the angular velocity of output shaft 50 decelerates from a maximum back to zero. At the end of one complete rotation of the clutch shaft, the clutch is disengaged, as explained above, so that the clutch shaft 42 stops rotating, and the mechanism is set for the next operation of solenoid 52.

With the mechanism described above, it is assured that all motion of the film within the camera is gradual, and there are no sudden stops or starts of the film with the resulting deleterious effects.

The clutch mechanism and actuators are shown in greater detail in FIG. 7. As shown in FIG. 7, the truncated conical clutch member 40 is composed of a plurality of fingers which are radially off-set (as best shown in FIG. 9), so that when the clutch member is driven into concentric relationship with the hollow cylindrical flywheel 38, any mutual rotation between the two members causes the fingers to engage in frictional engagement with the inner bore surface of the cylindrical member 38 in a self-tightening manner, to cause the clutch to be quickly engaged. Specifically, when the truncated conical clutch member 40 is driven into the hollow cylindrical flywheel 38, the ends of the fingers engage the bore surface of the flywheel. Then, any tendency of the clutch member 40 to rotate relative to flywheel 30, causes the fingers to turn and attempt to straighten out into a radial position which causes the ends of the fingers to move into a closer engagement with the bore surface. As shown in FIG. 9, resilient members 41 are interposed between each pair of radial fingers to act as shock absorbers as the radial fingers engage the inner bore surface of member 38.

As also shown in FIG. 7, actuator 46 includes a member which defines a radial channel 46, and actuator 48 includes a pin 86 which extends axially in parallel relationship with the axis of output shaft 50, and which is received in the channel 88. As clutch shaft 42 rotates, the engagement between the two actuators is as shown in FIG. 8, and the curve of FIG. 8 shows the variation in angular velocity of output shaft 50 as the clutch or input shaft 42 rotates, so as to provide the desired lost motion action.

The invention provides, therefore, an improved lost motion drive mechanism for use in a film transport, or in any other mechanism in which a mass is to be moved without shock, so that inertia problems in either starting or stopping the mass are overcome.

It will be appreciated that while a particular embodiment of the invention has been shown and described, modifications may be made. It is intended in the claims to cover the modifications which come within the spirit and scope of the invention.

What is claimed is:

1. A lost-motion drive mechanism for a high speed X-ray film transport, or the like, comprising: a drive motor; input shaft means rotatably mounted about a first axis; a clutch assembly selectively coupling the input shaft means to the drive motor; an output shaft rotatable about a second axis displaced radially from said first axis; a first actuator coupled to the input shaft means to be rotatably driven thereby about the first axis; a second actuator coupled to the output shaft to be rotatably driven thereby around the second axis; one of said actuators including a pin displaced radially from the axis of rotation thereof and extending axially with respect to such axis, and the other of said actuators including a member defining a radially-extending channel for slidably receiving said pin; a clutch-actuating member slidably mounted on said input shaft means and coupled to said clutch assembly; a frame; a cam member mounted on said frame for movement between a first and a second position; a cam follower mounted on said clutch actuating member and extending radially therefrom to engage said cam member when said cam member is in its first position and thereby move said clutch actuating member in a first direction to cause the clutch to disengage and uncouple the input shaft means from the drive motor; a latch mounted on said frame and coupled to said cam member for retaining the cam member in its first position; and solenoid means mounted on said frame and coupled to said latch for releasing the cam member when the solenoid means is energized to cause said cam follower to move the cam member to its second position and the clutch actuating member to move in a second direction to cause the clutch assembly to engage and couple the input shaft means to the drive motor.

2. The lost motion drive mechanism defined in claim 1, in which said clutch assembly comprises a hollow cylindrical member coupled to the drive motor, and a tapered truncated conical-shaped member coaxially mounted with respect to said cylindrical member and coupled to said input shaft means, the tapered truncated conical-shaped member being driven into concentric frictional relationship with the inner surface of the hollow cylindrical member when the clutch-actuating member is moved in said second direction.

3. The lost motion drive mechanism defined in claim 2, in which said truncated conical-shaped member comprises a plurality of radially offset radial elements offset to be driven into frictional self-tightening engagement with the bore surface of the cylindrical member when the truncated conical-shaped member is driven into concentric relationship with the cylindrical member when the clutch-actuating member is moved in said second direction.

4. The lost motion drive mechanism defined in claim 1, and which includes first resilient means coupled to said clutch-actuating member for biasing said clutch actuating member in said second direction.

5. The lost motion drive mechanism defined in claim 4, and which includes second resilient means coupled to said cam member for returning said cam member to its first position, and third resilient means coupled to said latch to cause said latch to retain the cam member in its first position after the solenoid means has been de-energized so as to cause the cam member to be engaged by the cam follower after one complete revolution of the input shaft means to move the clutch actuating member in said first direction to disengage the clutch.

6. The lost motion drive mechanism defined in claim 1, in which said input shaft means includes an input shaft coupled to said first actuator and a clutch shaft coaxial with said input shaft and coupled to the clutch assembly, said clutch shaft being movable axially with respect to said input shaft along said first axis; and in which said clutch actuating member comprises a coupler mounted on said clutch shaft and engaging the end of said input shaft to be movable axially with said clutch shaft.

* * * * *